United States Patent [19]

Iwasaki

[11] 4,351,191
[45] Sep. 28, 1982

[54] PRESSURE SENSOR

[75] Inventor: Shinichiro Iwasaki, Auburn Heights, Mich.

[73] Assignee: Aisin Seiki Company, Limited, Kariya, Japan

[21] Appl. No.: 182,700

[22] Filed: Aug. 29, 1980

[51] Int. Cl.³ .............................................. G01L 9/14
[52] U.S. Cl. ..................................... 73/728; 324/208
[58] Field of Search ................. 73/717, 722, 723, 728; 324/207, 208; 323/362

[56] References Cited

U.S. PATENT DOCUMENTS

| | | | |
|---|---|---|---|
| 3,168,830 | 2/1965 | Chass | 73/517 R X |
| 3,807,223 | 5/1974 | Juillerat et al. | |
| 3,855,528 | 12/1974 | Brown | |
| 3,877,314 | 4/1975 | Bernin | 73/517 B |
| 4,006,402 | 2/1977 | Mincuzzi | 73/722 |
| 4,042,898 | 8/1977 | Tomczak et al. | 336/30 |
| 4,140,971 | 2/1979 | Blincoe | 324/208 |
| 4,170,498 | 10/1979 | Jost et al. | 73/722 X |
| 4,226,126 | 9/1980 | Herden | 73/728 |

FOREIGN PATENT DOCUMENTS

| | | | |
|---|---|---|---|
| 2403744 | 8/1974 | Fed. Rep. of Germany | |
| 46-23674 | 8/1971 | Japan | 324/208 |
| 909023 | 11/1959 | United Kingdom | 324/207 |

OTHER PUBLICATIONS

"Force and Displacement Transducers..." by Mohri et al. from Electrical Engineering in Japan vol. 99, No. 2, pp. 105–112 (2–79).

*Primary Examiner*—James J. Gill
*Attorney, Agent, or Firm*—Oblon, Fisher, Spivak, McClelland & Maier

[57] ABSTRACT

A pressure sensor comprising a pressure-displacement transducer mechanism including a movable body driven by a hydraulic pressure to be determined and spring means for urging the movable body in a direction opposite to the pressure, and a displacement-pulse phase conversion unit including a ferromagnetic member secured to the movable body, a magnetically soft member carrying an electrical coil thereon and disposed at a stationary point adjacent to the region of movement of the ferromagnetic member and a permanent magnet. A pulse voltage is applied to one end of the electrical coil, the other end of which is connected in series with a resistor. A voltage drop across the resistor is detected, and a time lag of the voltage drop with respect to the pulse voltage, representing a displacement of the ferromagnetic member in response to a change in the hydraulic pressure, is determined and provided in the form of an analog voltage or a digital code.

8 Claims, 30 Drawing Figures

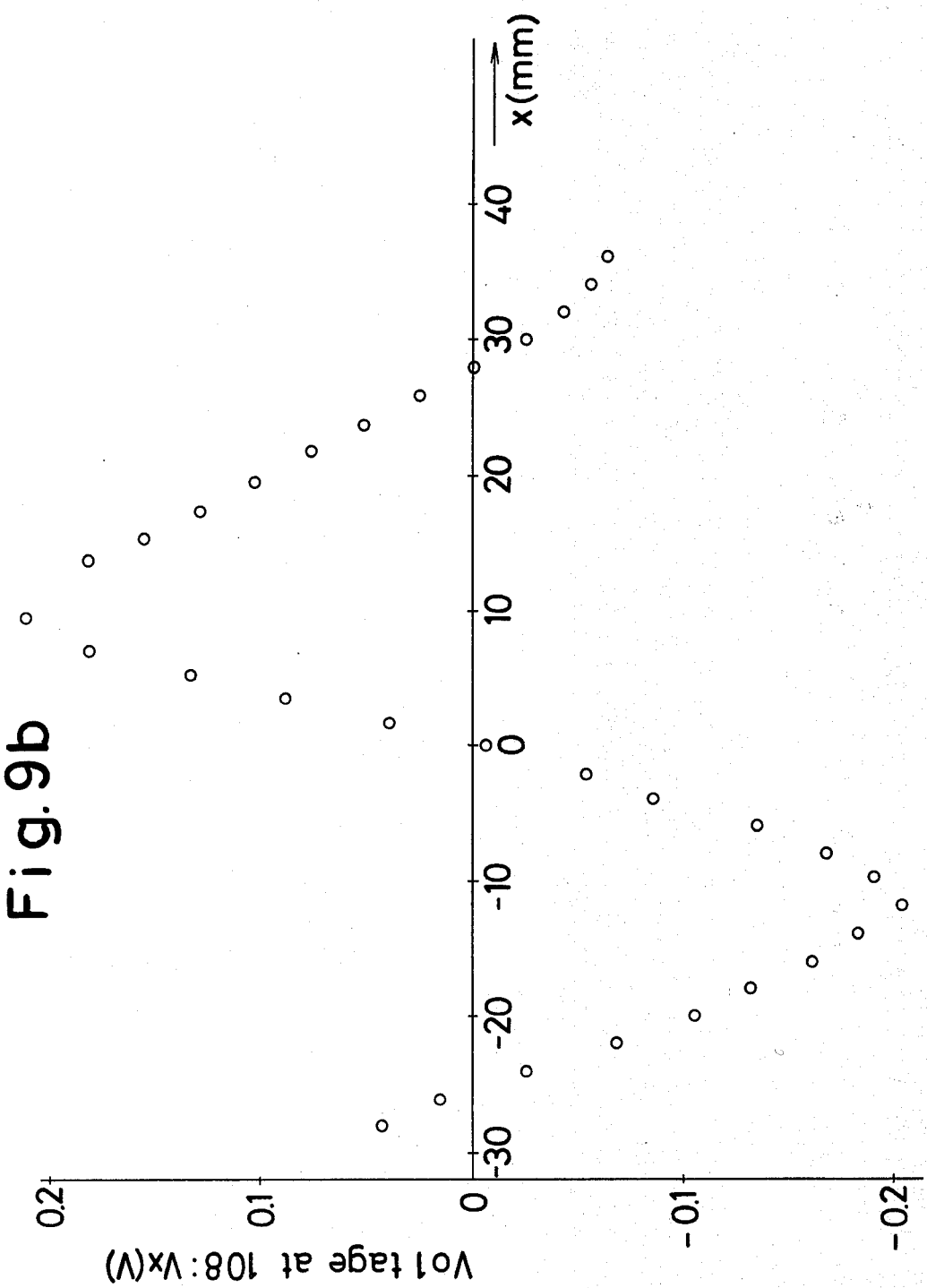

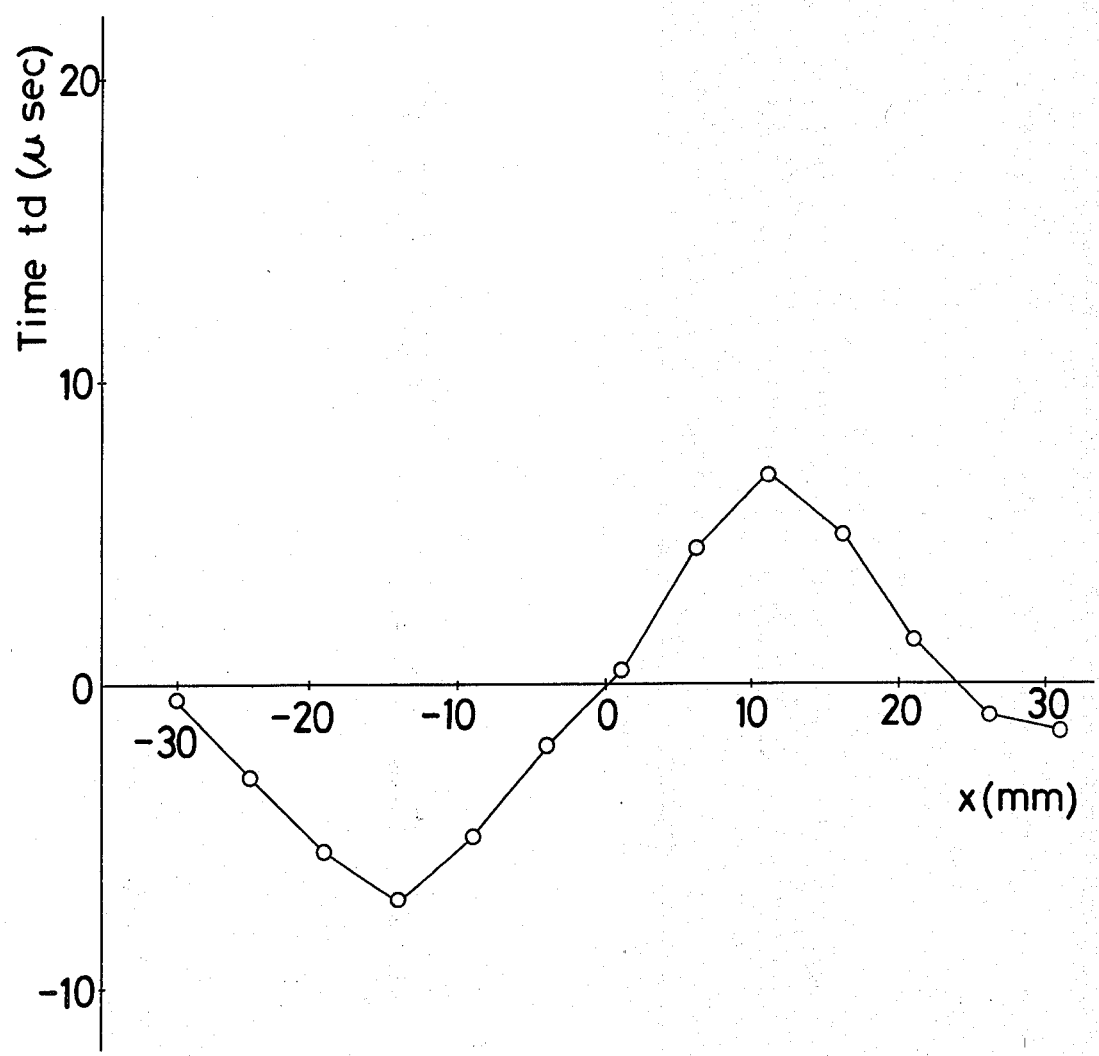

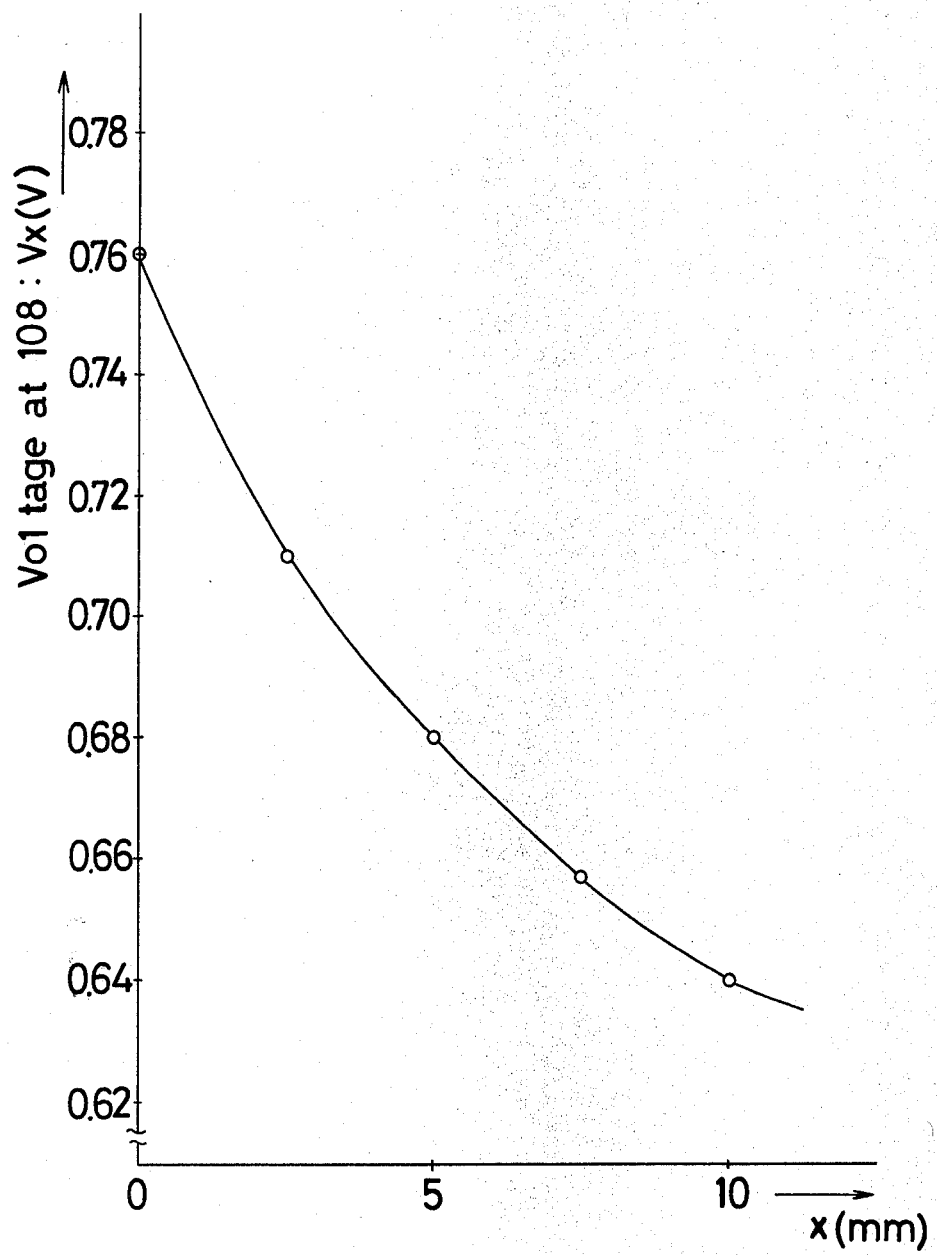

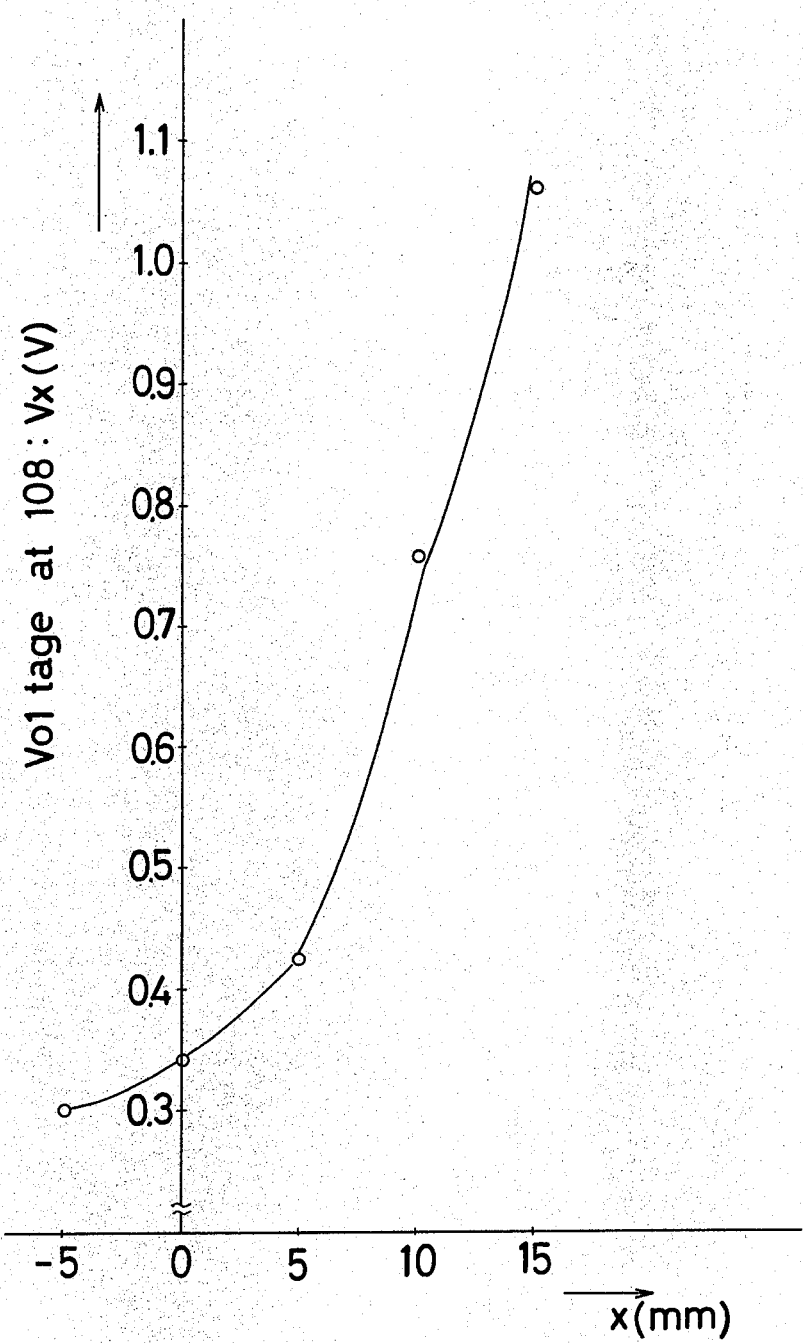

PRESSURE SENSOR

BACKGROUND OF THE INVENTION

1. Field of the Invention

This invention relates to a pressure sensor which translates a hydraulic pressure into an electrical signal, and more particularly, to a pressure sensor of the type including a movable body which is subject to a hydraulic pressure and in which a displacement produced in the movable body is converted into an electrical signal.

2. Description of the Prior Art

A conventional arrangement is known in which a diaphragm is subject to a hydraulic pressure and is normally urged by a coiled spring to oppose the hydraulic pressure, with the diaphragm being connected to a slider on a potentiometer. In this arrangement, the potentiometer provides an analog voltage corresponding to the amount of movement of the diaphragm when the latter is subjected to a hydraulic pressure. With this pressure sensor, it is desirable that a thin film resistor forming the potentiometer exhibits a high abrasion resistance and provides a stabilized reading of an output voltage for a given slider position. It is also desired that the movable body and the slider be mechanically connected together with a minimal degree of rattling and that a stabilized contact be maintained between the slider and the thin film resistor in the presence of oscillations or shocks. However, because the slider is brought into contact with the thin film resistor under pressure, an abrasion or oscillations may cause production of an unstabilized output voltage in respect to a hydraulic pressure.

SUMMARY OF THE INVENTION

Accordingly, one object of this invention is to provide a novel pressure sensor including non-contact type conversion means in which no mechanical contact mechanism is involved in a mechanical-to-electrical conversion system which converts a mechanical displacement indicative of pressure into a corresponding electrical signal.

Another object of this invention is to provide a novel solidly constructed pressure sensor having a high resistance to oscillations and shocks.

Yet another object of this invention is to provide a novel pressure sensor which requires only a relatively simple processing of a pressure detection signal.

A further object of this invention is to provide a novel pressure sensor capable of providing a pressure data read-out with a relatively simply read-out logic in the form of a large scale integrated circuit such as a microcomputer, the technology of which has been greatly advanced recently.

These and other objects are achieved in accordance with the invention, by providing a novel pressure sensor including a casing having an internal space divided by a movable body into a first space into which a hydraulic pressure to be determined is supplied and a second space through which a fluid, normally air, of a given pressure, normally an atmospheric pressure, is confined or passes. A magnetically soft member having an electric coil disposed thereon and a permanent magnet are disposed in one of the spaces, and a ferromagnetic member is arranged adjacent to the magnetically soft member and the permanent magnet and is fixedly mounted on the movable body. The magnetically soft member has a transverse cross-section of a reduced magnitude so that magnetic saturation is easily achieved. Accordingly, the movable ferromagnetic member which controls the flux passing through the magnetically soft member, which is produced by an external field, may have a reduced cross-sectional area. The electrical coil has an increased number of turns so that the magneticaly soft member can be magnetically saturated with a relatively low voltage applied or at a relatively low current level. The permanent magnet is physically reduced while being compatible with providing magnetic field of a magnitude to the magnetically soft member which depends on the travel of the ferromagnetic member within a predetermined extent of movement thereof.

A time T required for the magnetically soft member, which is disposed at a given spacing from the fixed permanent magnet, to saturate from the instant of application of a voltage to a coil disposed on the member can be expressed approximately as follows:

$$T = (N/E)(\phi_m - \phi_x) \qquad (1)$$

where E represents the voltage applied, N the number of turns in the coil, $\phi_m$ the maximum flux which is approximately equivalent to the saturation flux and $\phi_x$ a flux attributable to an external magnetic field applied to the magnetically soft member through the ferromagnetic member. As the magnitude of $\phi_x$ changes in response to a movement of the ferromagnetic member, the value of T also changes. In this manner, as the ferromagnetic member is displaced in response to a hydraulic pressure to cause a change in the external flux $\phi_x$ applied to the magnetically soft member, the length of time T from the application of a voltage to the coil until the coil current reaches a given level changes. Accordingly, in the pressure sensor of the invention, an electrical circuit or a semiconductor electronic device is provided which determines the value of T and provides an electrical signal in the form of a voltage level or a digital code indicative of such value. In a preferred embodiment of the invention, an amorphous magnetic material is used to form the magnetically soft member. Since an amorphous magnetic member must be manufactured by quenching from a liquid phase metal, it is formed as a thin sheet. It exhibits a ferromagnetism and has a high level of magnetic saturation, high permeability ($\mu max > 10^3$) and a low level of coercive force ($< 1.0$ Oe) while exhibiting a very high break strength and an excellent resiliency and stability. Such properties of an amorphous material are very preferred for use in the pressure sensor of this invention. Its use advantageously facilitates signal processing and increases the accuracy in the determination of the value of T. In addition, in mechanical aspects, the manufacturing is simplified while improving the resistance to oscillations or shocks. In a preferred embodiment of the invention, the ferromagnetic member is formed of amorphous soft iron. It exhibits a high permeability, which assures a large change in the external flux applied to the magnetically soft member, even with a small displacement.

Some magnetically soft materials are described in Hasegawa et al, "Soft Magnetic Properties of Metallic Glasses-Recent Developments", J. Appl. Phys. 50(3), March, 1979, pp. 1551–1556. Magnetically soft materials are sold under the trademark METGLAS (TM) by Allied Chemical Corp.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2b is a graph which shows the waveforms of input and output signals to or from the processing circuit shown in FIG. 2a;

FIG. 3b is a graph which illustrates input and output signals of the electrical processing circuit shown in FIG. 3a;

FIG. 6b is a graph which illustrates an indicating voltage $V_x$ representing a time delay $t_d$ with respect to the travel x of a 50 mm long ferromagnetic member in the X—X direction, utilizing the layout shown in FIG. 6a, with the electrical coil connected to the electrical processing circuit shown in FIG. 2a;

FIG. 6c is a graph which illustrates the pulse width or time delay $t_d$ with respect to the travel x of a 50 mm long ferromagnetic member in the X—X direction, utilizing the layout shown in FIG. 6a and connecting the electrical coil with the electrical processing circuit shown in FIG. 3a;

FIG. 9b is a graph which shows voltage data indicative of a time lag $t_d$ which varies in accordance with the travel x of a 25 mm long ferromagnetic member in the X—X direction, utilizing the arrangement shown in FIG. 9a and a pair of electrical coils spaced apart by 50 mm and connected to the electrical processing circuit shown in FIG. 8a;

FIG. 9c is a graph which illustrates the pulse width in μs of the time delay $t_d$ with respect to the travel x of a 25 mm long ferromagnetic member in the X—X direction, utilizing the layout shown in FIG. 9a and providin a spacing of 50 mm between the electrical coils which are connected to the electrical processing circuit of FIG. 3a;

FIG. 11 is a graph which illustrates the indicating voltage V representing the time delay $t_d$ with respect to the travel of the ferromagnetic member of FIG. 10;

FIG. 16b is a graph which shows the voltage $V_x$ representing the time delay $t_d$ with respect to the travel of the ferromagnetic member of FIGS. 14 and 15;

DETAILED DESCRIPTION OF THE PREFERRED EMBODIMENTS

First Embodiment (FIGS. 1 to 6c)

Figure 1:
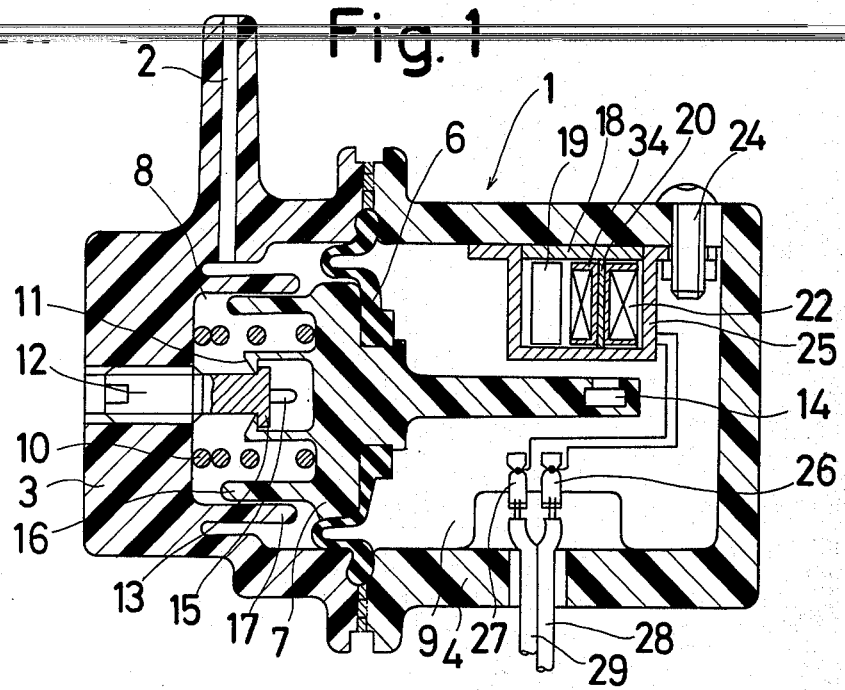
FIG. 1 is a longitudinal cross-sectional view of a pressure sensor according to one embodiment of the invention.

Referring now to the drawings, wherein like referfirst space 8, against the resilience of the spring 10, whereby the ferromagnetic member 14 moves axially to the left while maintaining a perpendicular relationship with the magnetically soft member 20 and the permanent magnet 19. A displaced position of the ferromagnetic member 14 is detected by an electrical processing circuit or an electronic logical processing unit.

Figure 2A:
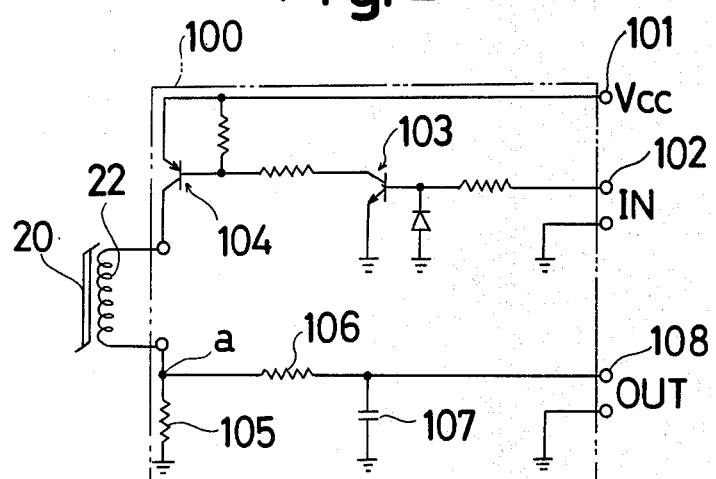
FIG. 2a is a circuit diagram of an electrical processing circuit connected to the pressure sensor shown in FIG. 1 for producing an analog voltage of a level which corresponds to the pressure detected.
Figure 2B:
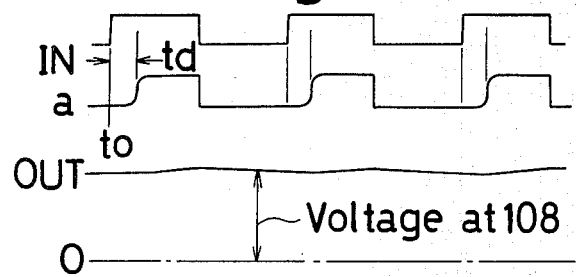
Figure 3A:
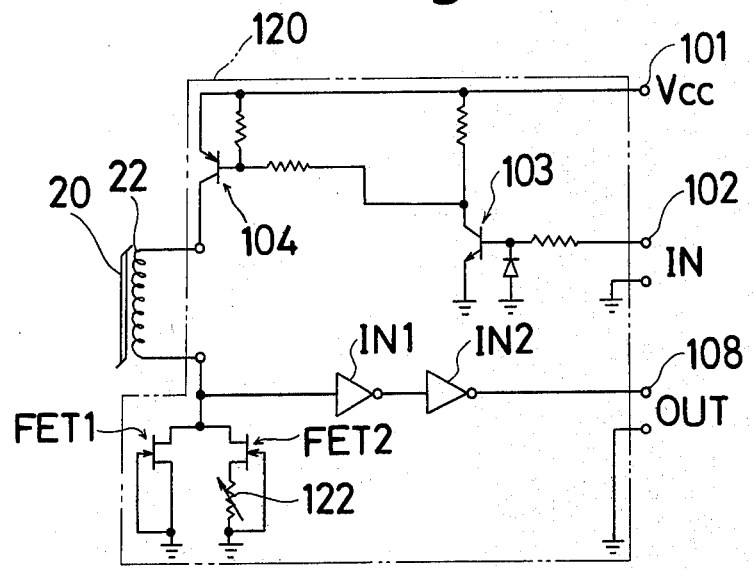
FIG. 3a is a circuit diagram of another electrical processing circuit connected to the electrical coil of the pressure sensor shown in FIG. 1 to produce a delayed pulse having a time delay which corresponds to the pressure detected.
Figure 3B:
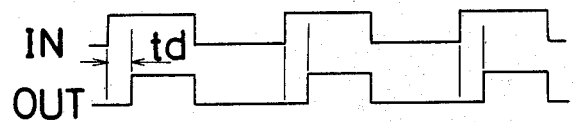
Figure 4:
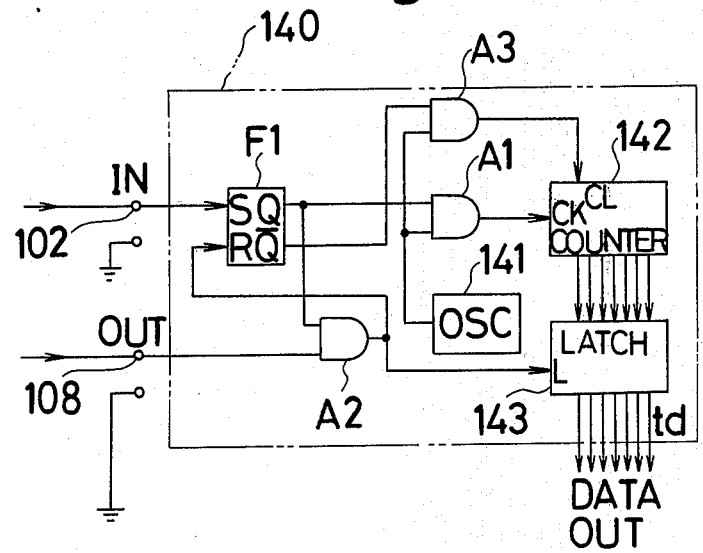
FIG. 4 is a block diagram of a counter circuit which converts the time delay between the input and the output pulses of the electrical processing circuit shown in FIG. 3a into a digital code.

FIG. 2a shows one form of electrical processing cirapplied to an AND gate A2, which produces a high level or "1" when the output pulse (OUT) rises to a high level. At this point in time, the flip flop F1 is reset, with its Q output reverting to a low level or "0". This disables the AND gate A1, and hence the supply of a clock pulse to the counter 142 is interrupted. At the time when the AND gate A2 produces a "1" output, a code indicative of the count in the counter 142 is stored in a latch 143. After the flip flop F1 is reset and the latch 143 has been loaded with the count code, an AND gate A3 passes a clock pulse to clear the counter 142. An output code from the latch 143 indicates the number of clock pulses passed during the time interval of $t_d$, and hence represents the magnitude of $t_d$.

Figure 5:
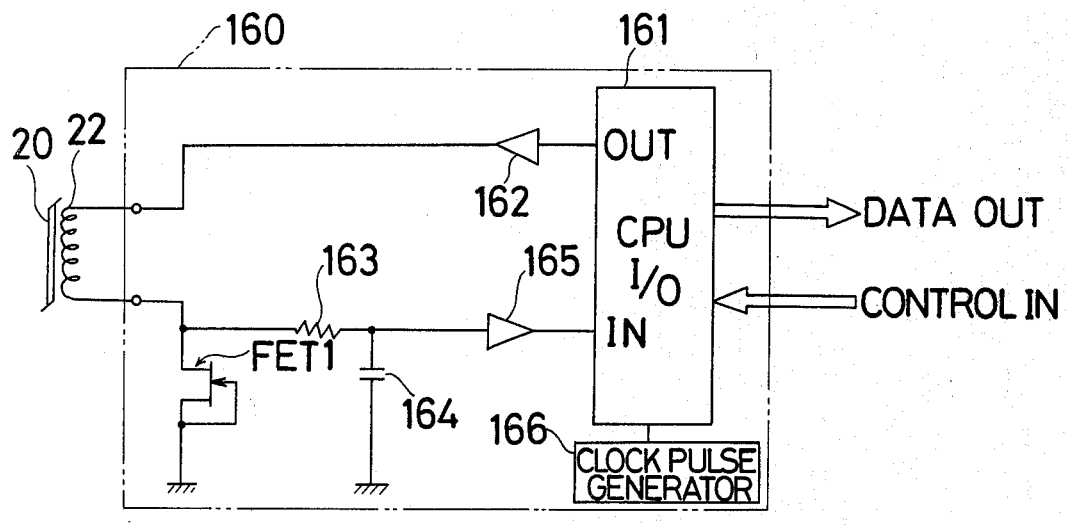
FIG. 5 is a block diagram of an electronic processing unit including a single chip microcomputer connected to the electrical coil of the pressure sensor shown in FIG. 1 to count, in a digital manner, the time delay from the application of the input pulse to the rising edge of the current flow through the electrical coil.

An electronic processing unit 160 shown in FIG. 5 comprises a single chip microcomputer (a large scale integrated semiconductor unit) 161, an amplifier 162, a junction N-channel field effect transistor FET 1 which acts as a constant current source, a resistor 163, a capacitor 164, an amplifier 165 and a clock pulse oscillator 166. The combination of the resistor 163 and the capacitor 164 forms a filter which removes voltage oscillations of higher frequencies than the frequency of the input and the output pulses. The microcomputer 161 forms pulses of a given frequency in a range from 5 to 30 kHz based on the clock pulses from the clock pulse generator, and feeds these pulses to the amplifier 162. On the other hand, the microcomputer 161 monitors the voltage developed at the junction between the N-channel FET 1 and one end of the coil 22, or the output voltage of the amplifier 165, and counts the clock pulses which are developed during the time from the rising edge of the pulse outputted by itself until the output voltage of the amplifier 165 rises to a given level. Such time interval corresponds to $t_d$, and the microcomputer forms an output code indicative of the value of $t_d$ (DATA OUT).

As discussed above, the pressure sensor 1 of FIG. 1 may be connected to a variety of electrical processing circuits or an electronic logical processing unit to provide an electrical signal indicative of the location of the ferromagnetic member 14 within the pressure sensor 1. The use of the pressure sensor 1 shown in FIG. 1 in combination with one of the electrical processing circuits 100, 120, 140 or the logical processing unit 160 permits an electrical signal to be obtained which depends on the negative hydraulic pressure. Initially, the negative pressure prevailing at the inlet 2 is converted into the position of the ferromagnetic member 14 by the diaphragm 6, holder 7 and spring 10 of the pressure sensor 1.

The conversion of the position of the ferromagnetic member 14 into a corresponding electrical signal will be described with reference to experimental data illustrated in FIGS. 6b and 6c.

Figure 6A:
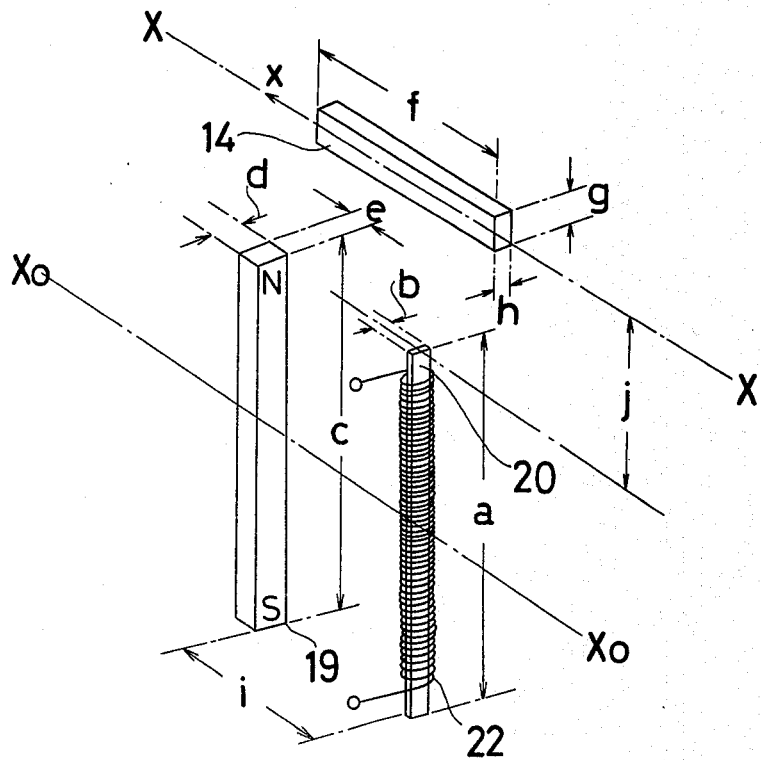
FIG. 6a is a perspective view of a member of an amorphous, magnetically soft metal material, indicating various dimensions which are utilized in an experiment to determine a load indicating voltage $V_x$ and a pulse time delay $t_d$ which are obtained when the member is subjected to a lengthwise tensile load.

Referring to FIG. 6a, the magnetically soft member 20 and the permanent magnet 19 are fixedly mounted in parallel relationship. An axis $X_0$—$X_0$ is chosen perpendicular to the longitudinal axes of the magnetically soft member 20 and the permanent magnet 19. The ferromagnetic member 14 is disposed in alignment with an axis X—X which is parallel to the axis $X_0$—$X_0$ and which is located at a given distance j from the magnetically soft member 20. Using the described arrangement, the inventor has determined the voltage $V_x$ indicative of the time delay and the pulse width with respect to the travel x of the ferromagnetic member 14 in the X—X direction, with the origin (x=0) being defined as the alignment of the left-hand end, as viewed in FIG. 6a, of the ferromagnetic member 14 with an extension of the longitudinal axis of the magnetically soft member 20. Various dimensions a to j and the material used are indicated in the Table 1, together with the designation of Figures which illustrate the data obtained.

TABLE 1

| Case No. | magnetically soft members 20 | | | | | coil 22 | magnet 19 | | |
|---|---|---|---|---|---|---|---|---|---|
| | material, atomic weight percent | thickness mm | $a_{mm}$ | $b_{mm}$ | number of sheets | number of turns | $c_{mm}$ | $d_{mm}$ | $e_{mm}$ |
| 1 | $Fe_{40}Ni_{40}P_{14}B_6$ amorphous | 0.058 | 40 | 1.8 | 4 | 1000 | 40 | 5 | 5 |
| 2 | $Fe_{40}Ni_{40}P_{14}B_6$ amorphous | " | " | " | " | " | " | " | " |
| 5 | $Fe_{40}Ni_{40}P_{14}B_6$ amorphous | " | " | " | " | " | " | " | " |
| 6 | $Fe_{40}Ni_{40}P_{14}B_6$ amorphous | " | " | " | " | " | " | " | " |
| 7 | $Fe_{40}Ni_{40}P_{14}B_6$ amorphous | " | " | " | " | " | " | " | " |

Figure 6B:
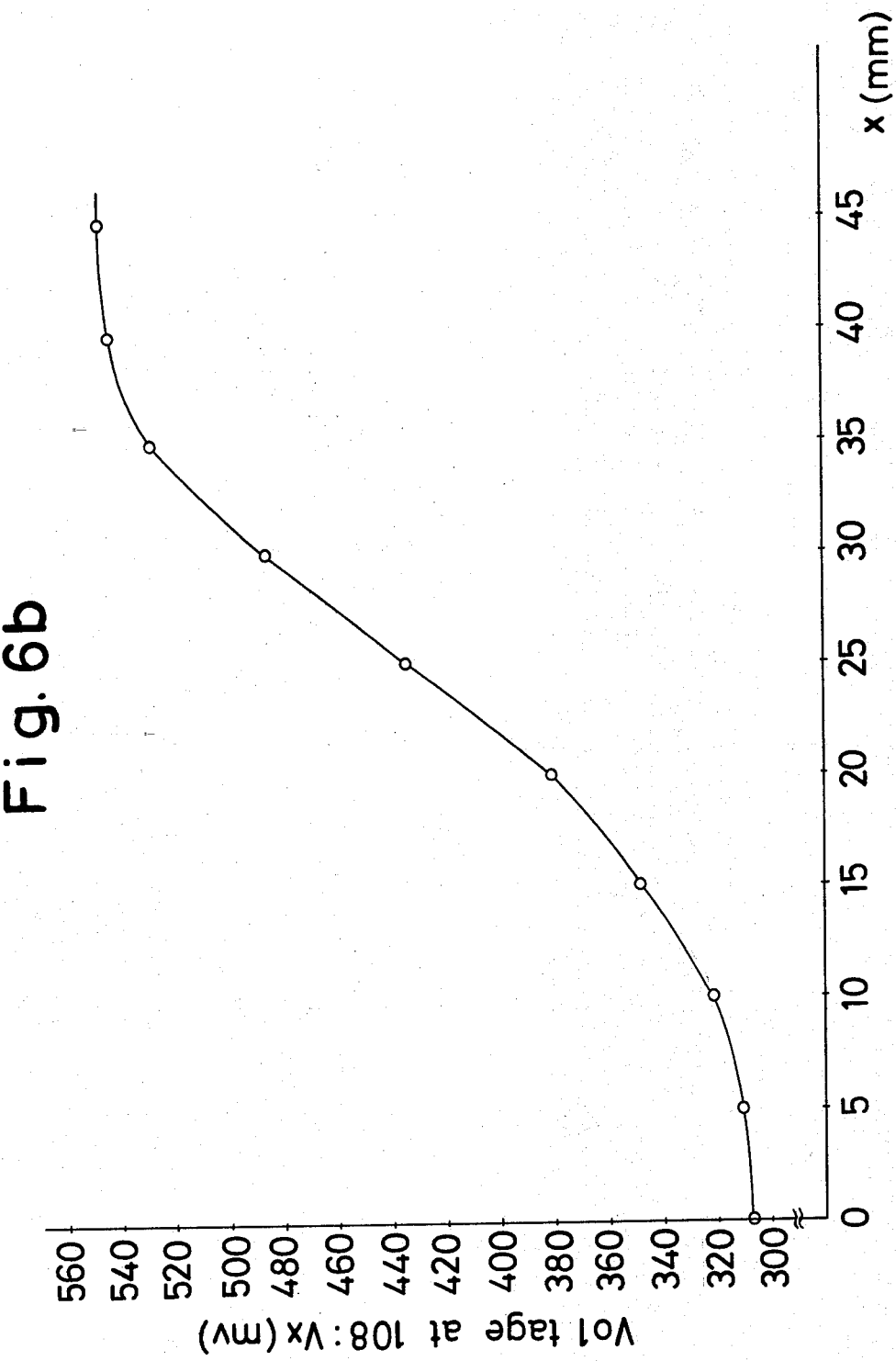
Figure 6C:
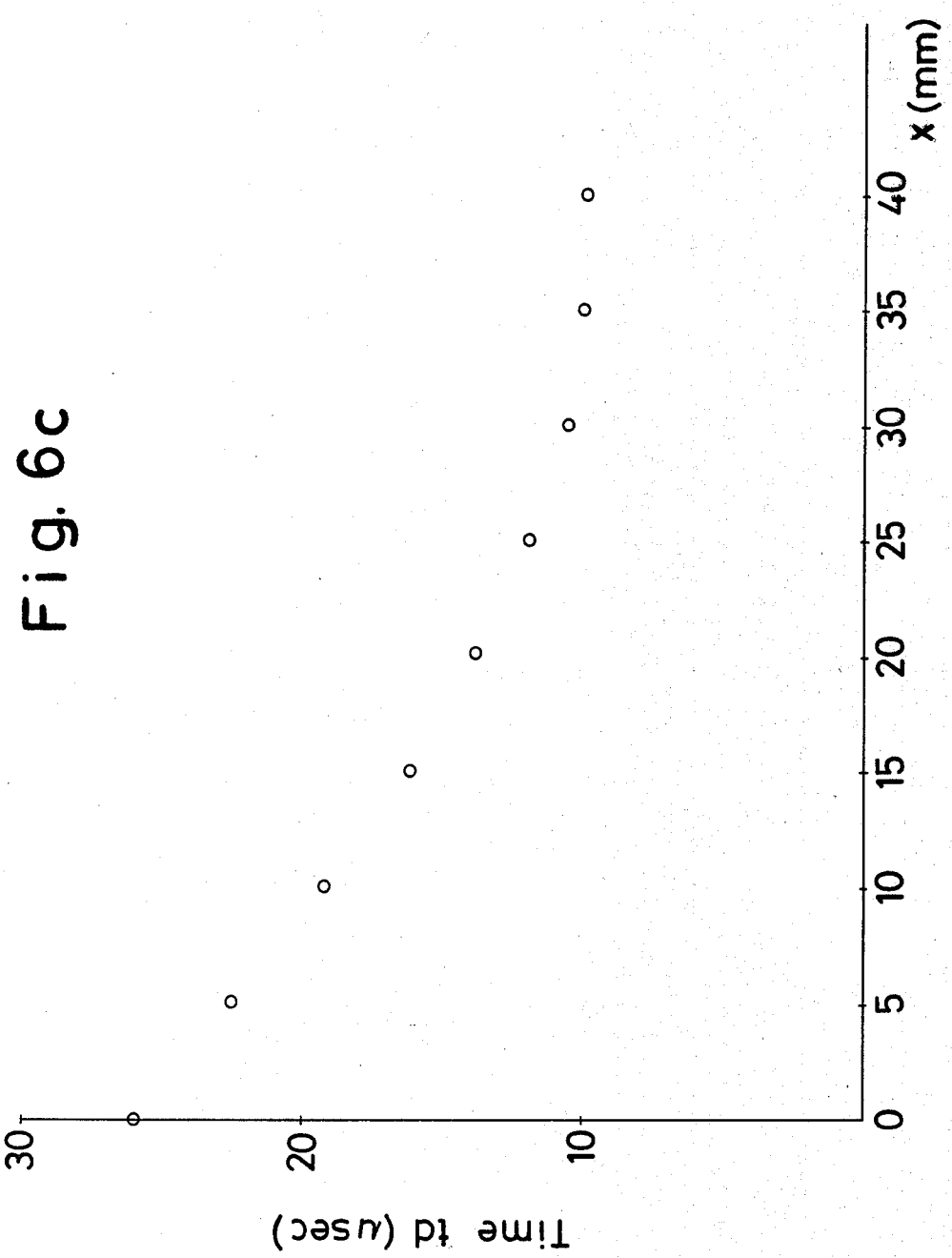
Figure 13A:
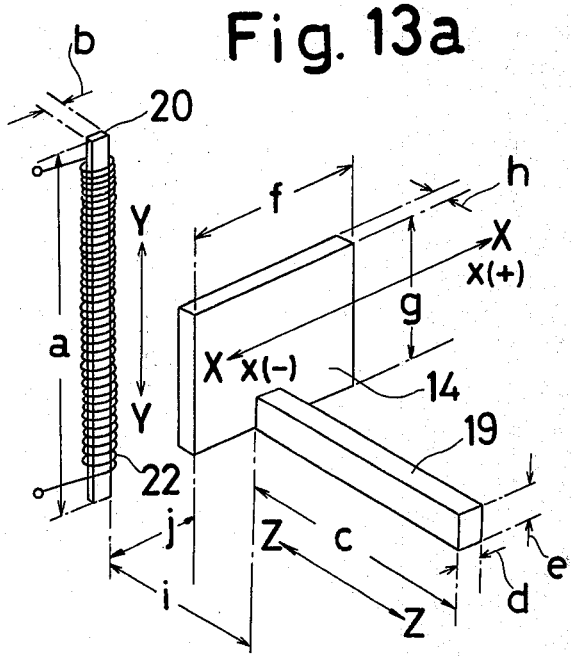
FIG. 13a is a perspective view showing the relative position of the ferromagnetic member with respect to the magnetically soft member and the permanent magnet, which arrangement is utilized to determine experimentally the pulse time delay $t_d$ which depends on the location of the ferromagnetic member 14 with respect to the magnetically soft member and the permanent magnet of FIG. 12.

| Case No. | ferromagnetic member 14 | | | | | | | |
|---|---|---|---|---|---|---|---|---|
| | material (% by atomic weight) | $f_{mm}$ | $g_{mm}$ | $h_{mm}$ | spacing $l_{mm}$ | $j_{mm}$ | measuring means & input pulse frequency | voltage polarity | data |
| 1 | $Fe_{81}B_{13.5}Si_{3.5}C_2$ amorphous | 50 | 10 | 2 | 40 | 2 | circuit 100 5kHz | N-N | FIG. 6b |
| 2 | $Fe_{81}B_{13.5}Si_{3.5}C_2$ amorphous | " | " | " | " | " | circuit 120 5kHz | N-N | FIG. 6c |
| 5 | $Fe_{81}B_{13.5}Si_{3.5}C_2$ amorphous | 25 | " | " | 30 | x | circuit 100 5kHz | N-N | FIG. 11 |
| 6 | $Fe_{81}B_{13.5}Si_{3.5}C_2$ amorphous | " | " | " | 5 | x | circuit 100 5kHz | N-N | FIG. 13a |
| 7 | $Fe_{81}B_{13.5}$ | 50 | 30 | 2 | 15 | x | circuit 100 | N-N | FIG. |

($t_{d1}-t_{d2}$), to produce a corresponding output code $S_x = S_{20} - S_{21}$. As far as a measurement control command signal is present, the microcomputer continues such operation.

Figure 9A:
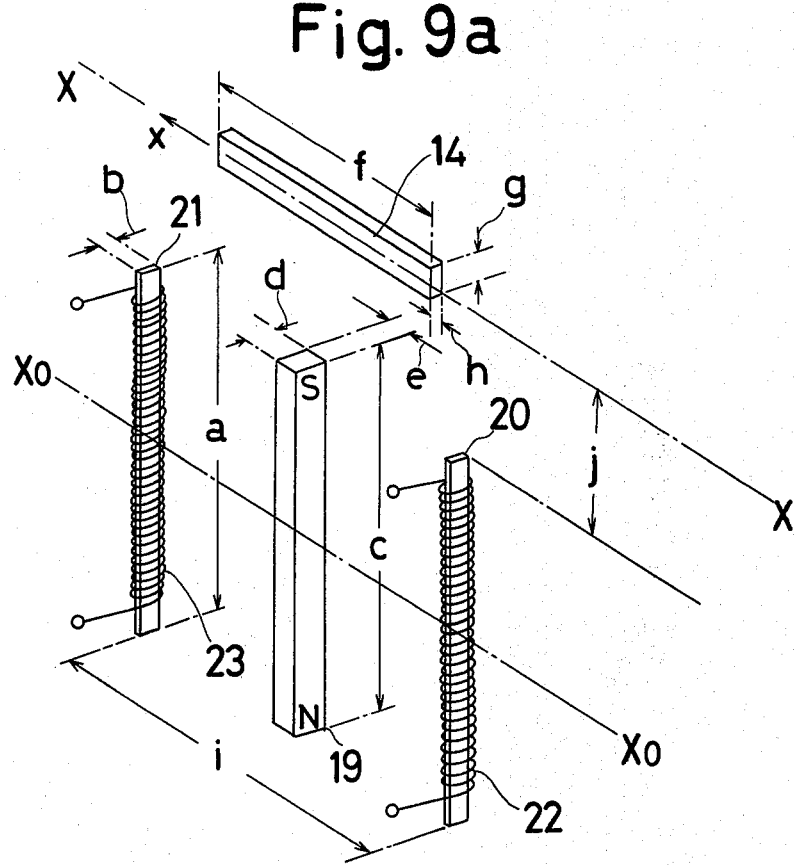
FIG. 9a is a perspective view illustrating the relative position of a ferromagnetic member with respect to a pair of magnetically soft members and a permanent magnet, which arrangement is used to determine a time lag of associated electrical coils in accordance with such relative position.

Referring to FIG. 9a, the ferromagnetic members 20, 21 are fixedly mounted in parallel relationship, with the permanent magnet 19 fixedly mounted intermediate these members. An axis $X_0$—$X_0$ is chosen to be perpendicular to the longitudinal axes of the magnetically soft members 20, 21 and the permanent magnet 19, and the ferromagnetic member 14 is movably disposed on an axis X—X which is parallel to the axis $X_0$—$X_0$ and which is spaced from the magnetically soft members 20, 21 by a given distance j. Using the layout, the inventor has determined the voltage $V_x$ representing the time delay and the pulse width μs with respect to the travel x of the ferromagnetic member 14 in the X—X direction, with the origin (x=0) defined as the position of the ferromagnetic member 14 which is just midway between the magnetically soft members 20, 21. The various dimensions a to j and materials used are indicated in the Table 2 below, together with the designation of Figures which illustrate the data obtained

TABLE 2

| | magnetically soft members 20,21 | | | | coils 22,23 | | | |
|---|---|---|---|---|---|---|---|---|
| Case No. | material,atomic weight percent | thickness mm | $a_{mm}$ | $b_{mm}$ | number of sheets | number of turns | magnet 19 | | |
| | | | | | | | $c_{mm}$ | $d_{mm}$ | $e_{mm}$ |
| 3 | Fe₄₀Ni₄₀P₁₄B₆ amorphous | 0.058 | 40 | 5 | 4 | 800 | 40 | 5 | 5 |
| 4 | Fe₄₀Ni₄₀P₁₄B₆ amorphous | " | " | " | " | " | " | " | " |

| Case No. | ferromagnetic member 14 material atomic weight percent | $f_{mm}$ | $g_{mm}$ | $h_{mm}$ | spacing $l_{mm}$ | $j_{mm}$ | measuring means & input pulse frequency | voltage polarity | data |
|---|---|---|---|---|---|---|---|---|---|
| 3 | Fe₄₀Ni₄₀P₁₄B₆ amorphous | 25 | 10 | 2 | 50 | 5 | circuit 180 5kHz | N-S | FIG. 9b |
| 4 | Fe₄₀Ni₄₀P₁₄B₆ amorphous | " | " | " | " | " | pair of circuits 120 5kHz | N-N | FIG. 9c |

The voltage polarity S-N indicates that the coil is connected to the electrical circuit in a manner such that the upper end of the magnetically soft members, as viewed in FIG. 9a, represents an S-pole while the voltage polarity N—N indicates that the connection of the coil to the electrical circuit is such that the upper end of the magnetically soft members represents an N-pole.

Figure 8A:
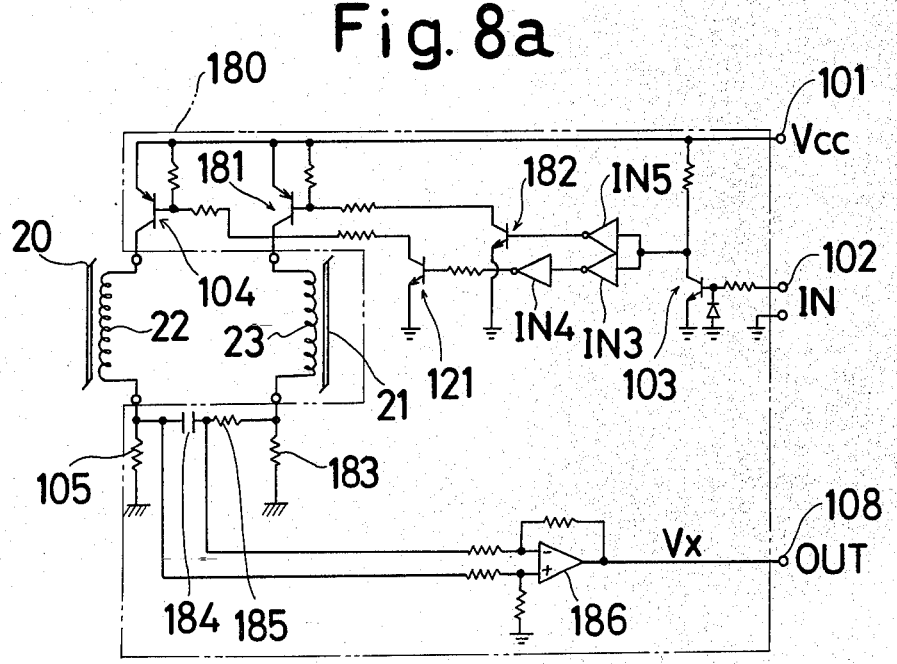
FIG. 8a is a circuit diagram of an electrical processing circuit connected to the pressure sensor shown in FIG. 7 for producing an analog voltage of a level which depends on the pressure detected.
Figure 8B:
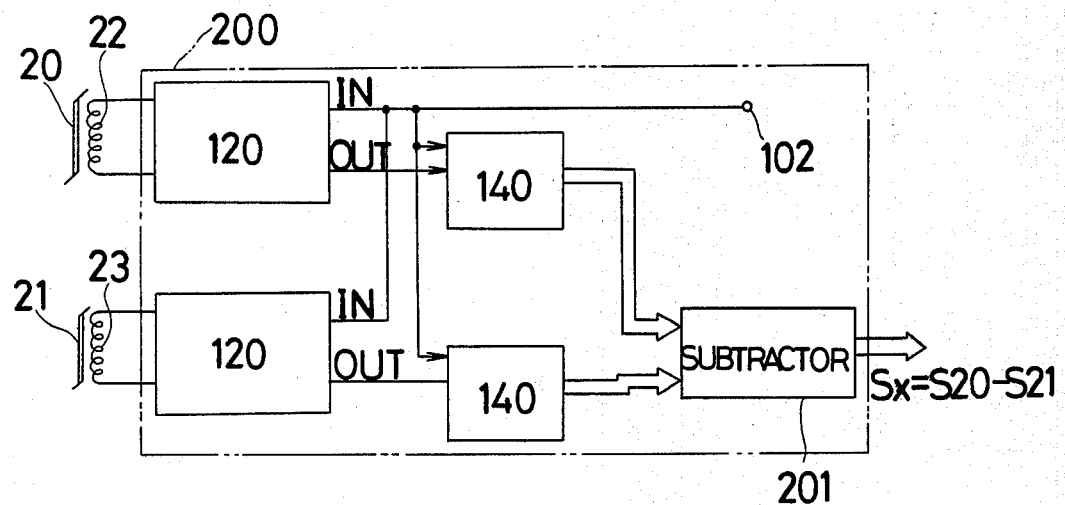
FIG. 8b is a block diagram of an electrical processing circuit connected to the pressure sensor shown in FIG. 7 for producing a digital code which represents the pressure detected.

The experimental data illustrated in FIG. 9b shows that a voltage $V_x$ having a good linearity and a high accuracy is obtained for a travel x of the ferromagnetic member 14 from −10 to +10 mm, or from −30 to −12 mm or from +10 to +30 mm. The data of FIG. 9c represents a difference between the pulse width μs of the individual time delays $t_d$, and is obtained by connecting the electrical processing circuit 120 of FIG. 3a with the electrical coils 22, 23 shown in FIG. 8b. It will be seen that a pulse width μs having a good linearity and a high accuracy is obtained for a travel x of the ferromagnetic member 14 in a range from −15 to +15 mm or from −30 to −15 mm or from +10 to +25 mm.

Figure 10:
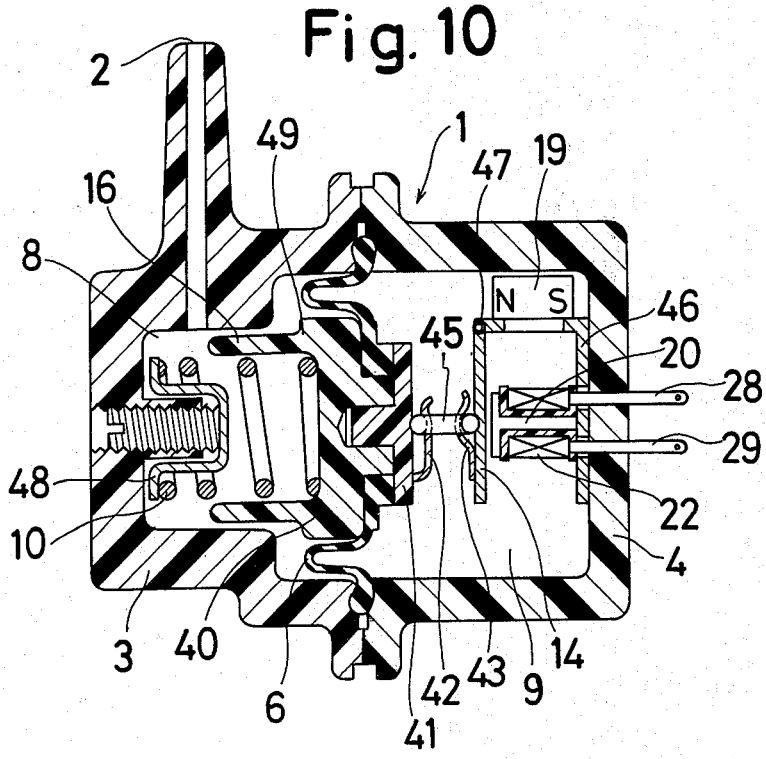
FIG. 10 is a longitudinal cross-sectional view of a pressure sensor according to a further embodiment of the invention.

Third Embodiment (FIGS. 10 and 11)

The pressure sensor 1 shown in FIG. 10 includes first and second members 40, 41 which are secured to the inner periphery of the diaphragm 6 to define a movable body together with the latter. On its righthand side, the second member 41 is provided with a connecting piece 42 for engagement with a projection of a connecting member 45 which has another projection for engagement with a connecting piece 43 fixedly mounted on the ferromagnetic member 14 so that the ferromagnetic member 14 is operated for displacement in response to a displacement of the movable body. More specifically, the upper end of the ferromagnetic member 14 is pivotally mounted, as shown at 47, on another ferromagnetic member 46 which is fixedly mounted on the body 4 and functions as a yoke. In this manner, the ferromagnetic member 14 is angularly movable to the left, as viewed in FIG. 10, about the pivot in response to a displacement of the movable body. In the present embodiment, the longitudinal axes of the permanent magnet 19 which is fixedly mounted on the ferromagnetic member 46 and of the magnetically soft member 20 on which the electrical coil 22 is disposed are parallel to the direction of displacement of the movable body or the X—X direction as shown in FIG. 6a, so that the ferromagnetic member 14 is displaced in the direction of the longitudinal axes of the permanent magnet 19 and the electrical coil 22 or in the X—X direction.

The spring 10 has its one end disposed in abutment against a retainer 48 which is positioned by the adjusting screw 12, whereby its resilience can be adjusted. The displacement of the movable body comprising the diaphragm 6, the first and the second members 40, 41 to the right is limited by the abutment of the ferromagnetic member 14 against the magnetically soft member 20 as the displacement is transmitted to the ferromagnetic member through the connection member 45. On the other hand, the displacement of the movable body to the left is limited by the abutment of a shoulder 49 on the first member 40 against the body 3. It is to be understood that similar parts as those described above are designated by like reference characters without repeating their description.

Experimental data which is obtained as a result of the displacement of the ferromagnetic body 14 is illustrated in FIG. 11, with the configuration, dimensions and layout indicated as Case No. 5 in the Table 1. Choosing the origin (x=0) as the location where the ferromagnetic member 14 abuts against the magnetically soft member 20, it will be noted from the data illustrated in FIG. 11 that an output voltage $V_x$ having a high accuracy is obtained for a smaller travel x of the ferromagnetic member, with a good linearity of voltage change with respect to the travel.

Figure 12:
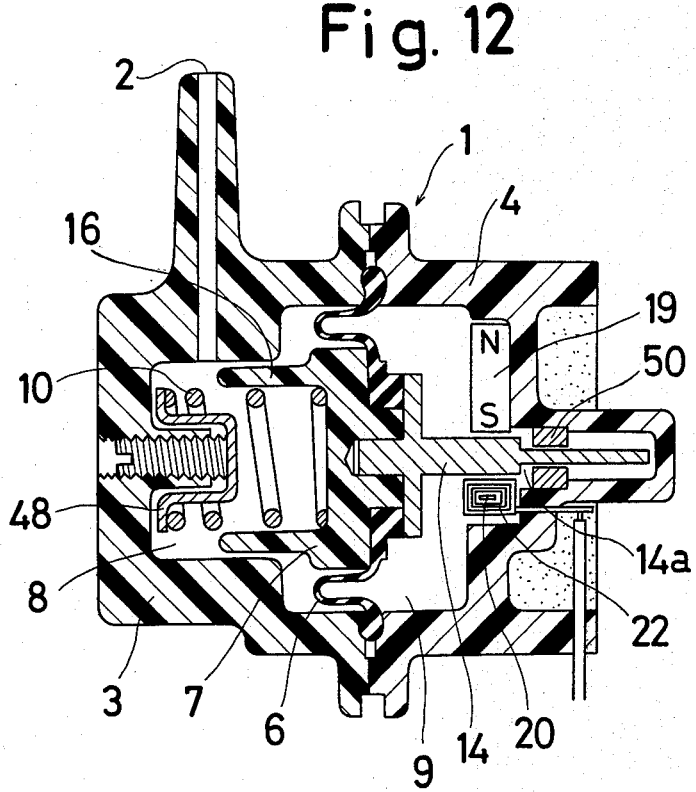
FIG. 12 is a longitudinal cross-sectional view of a pressure sensor according to still another embodiment of the invention.
Figure 13B:
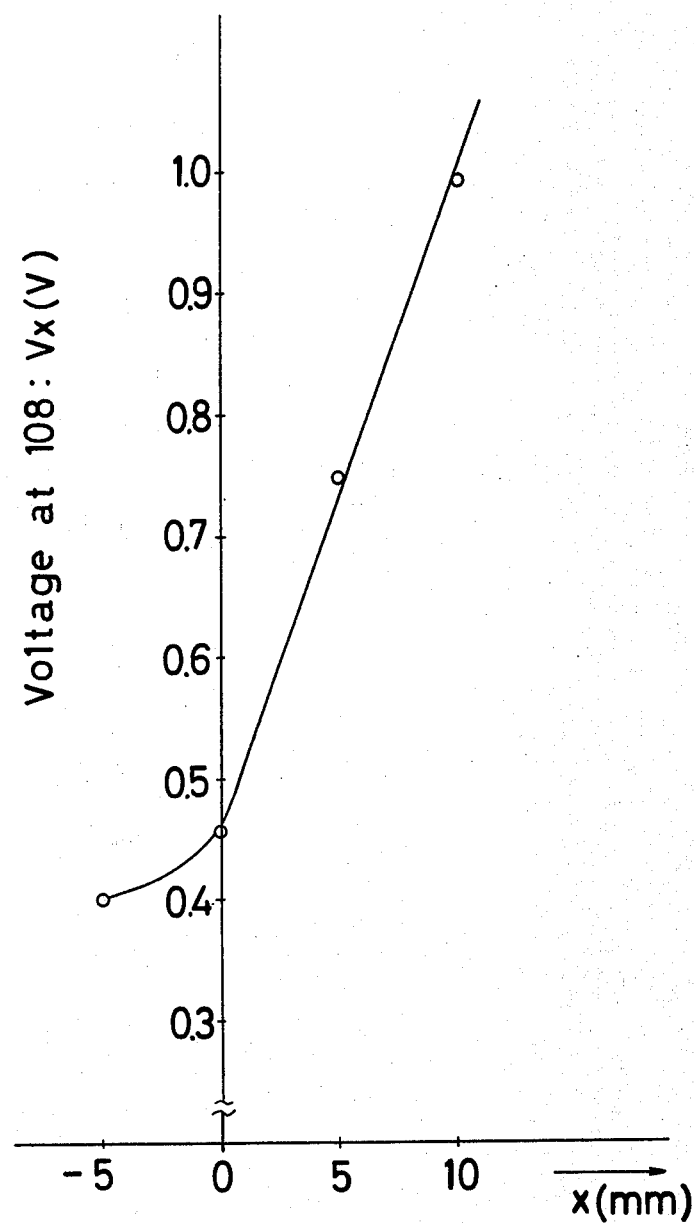
FIG. 13b is a graph which illustrates the indicating voltage $V_x$ representing the time delay $t_d$ with respect to the travel of the ferromagnetic member of FIG. 12.

Fourth Embodiment (FIGS. 12 to 13b)

In the pressure sensor 1 shown in FIG. 12, the ferromagnetic member 14 which is fixedly mounted on the movable body comprising the diaphragm 6 and the holder 7 is interposed between the permanent magnet 19 and the magnetically soft member 20. The magnetically soft member 20 and the ferromagnetic member 14 have their longitudinal axes located in the same orientations as shown in FIG. 1 (namely, Y—Y and X—X directions, respectively) while the permanent magnet 19 has its axis located in alignment with Z—Z direction. Such relationship is illustrated in FIG. 13a. A magnetic member 50 which is fixedly mounted on the cover 4 functions as a guide for the movement of the ferromagnetic member 14, and also functions as a yoke of a magnetic circuit which extends from the permanent magnet 19 through the ferromagnetic member 14 and the electrical coil 22 disposed on the magnetically soft member 20. In the other respect, the arrangement is similar to those described previously and therefore corresponding parts are designated by like reference characters without repeating their description.

Experimental data which is obtained as a result of the displacement of the ferromagnetic member 14 in the manner mentioned above is illustrated in FIG. 13b, with the dimensions and layout indicated as Case No. 6 in the Table 1. As indicated in FIG. 13a, the axis of the magnetically soft member 20 is disposed in alignment with the Y—Y direction, the axis of the ferromagnetic member 14 with the X—X direction and the axis of the permanent magnet 19 with the Z—Z direction, and the origin (x=0) is chosen when the distance j between the ferromagnetic member 14 and the magnetically soft member 20 (see FIG. 13a) is zero, with the axis of the ferromagnetic member 14 being located midway between the magnetically soft member 20 and the left-hand end of the permanent magnet 19. Using this layout, the inventor has determined the voltage $V_x$ representing the time delay with respect to the travel x of the ferromagnetic member 14 in the X—X direction relative to the magnetically soft member 20. FIG. 13b illustrates the resulting data obtained where it will be noted that an output voltage $V_x$ having a good linearity and a high accuracy is obtained for the travel x of the ferromagnetic member 14 between 0 and 10 mm.

Fifth Embodiment (FIGS. 14 to 16b)

Figure 14:
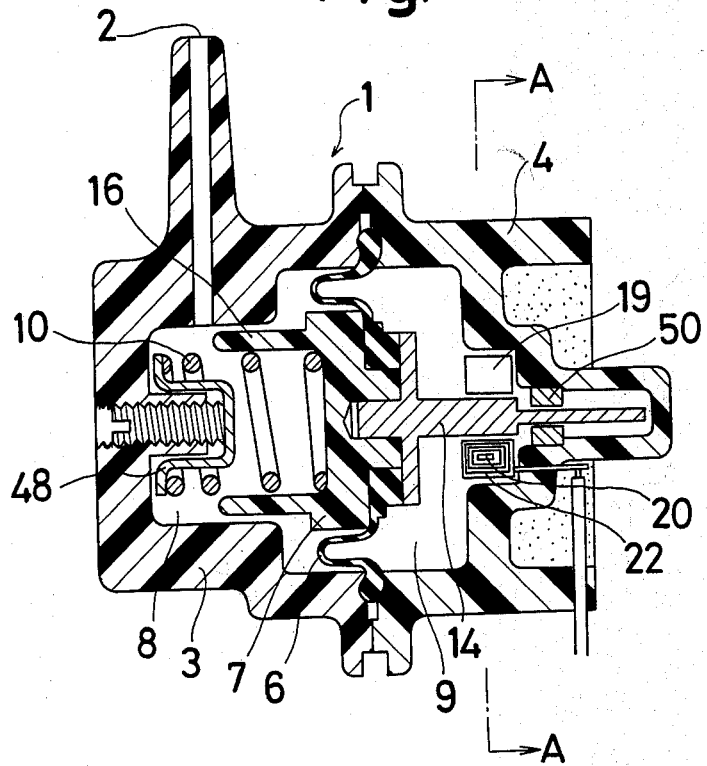
FIG. 14 is a longitudinal cross-sectional view of a pressure sensor according to a still further embodiment of the invention.
Figure 15:
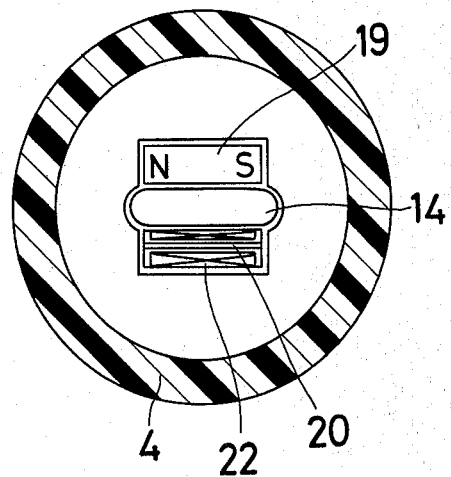
FIG. 15 is a cross-sectional view taken along the line A—A shown in FIG. 14.

The pressure sensor 1 shown in FIGS. 14 and 15 differs from the embodiment shown in FIG. 12 in that the axes of the permanent magnet 19, the magnetically soft member 20 and the ferromagnetic member 14 are in alignment with the X—X direction. Experimental data obtained with this manner of operation is illustrated in FIG. 16b, with the dimensions and the layout used being indicated as Case No. 7 in the Table 1.

Figure 16A:
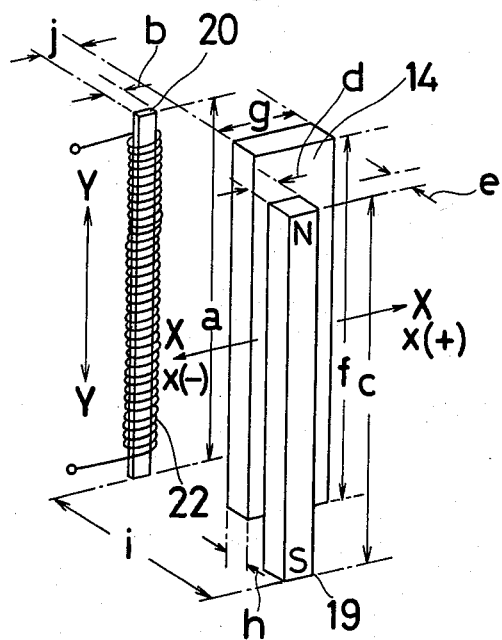
FIG. 16a is a perspective view showing the relative position of the ferromagnetic member with respect to the magnetically soft member and the permanent magnet of FIGS. 14 and 15, which arrangement is used to determine experimentally the pulse time delay $t_d$ which depends on the location of the ferromagnetic member with respect to the magnetically soft member and the permanent magnet.

Referring to FIG. 16a, the magnetically soft member 20, the permanent magnet 19 and the ferromagnetic member 14 have their longitudinal axes disposed in alignment with the Y—Y direction, with the axis of the ferromagnetic member 14 being located midway between the axes of the magnetically soft member 40 and the permanent magnet 19. The ferromagnetic member 14 is adapted to move in the X—X direction, with the origin (x=0) being chosen at the location where the distance j between the ferromagnetic member 14 and the magnetically soft member 20 (see FIG. 16a) is zero. Using the layout, the inventor has determined the voltage $V_x$ representing the time delay with respect to the travel x of the ferromagnetic member 14 in the X—X direction relative to the magnetically soft member 20. The data of FIG. 16 indicates that an output voltage having a good linearity and a high accuracy is obtained for the travel x of the ferromagnetic member 14 in a range from 5 to 15 mm.

Figure 18:
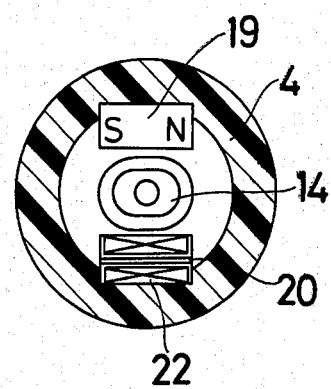
FIG. 18 is a cross-sectional view taken along the line B—B shown in FIG. 17.
Figure 17:
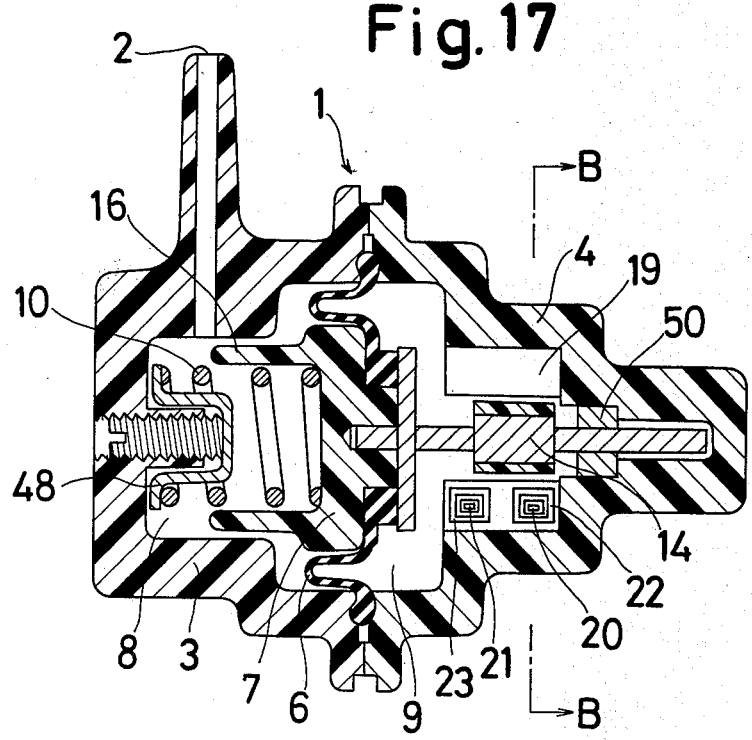
FIG. 17 is a longitudinal cross-sectional view of a pressure sensor according to yet another embodiment of the invention.

Sixth Embodiment (FIGS. 17 and 18)

Figure 7:
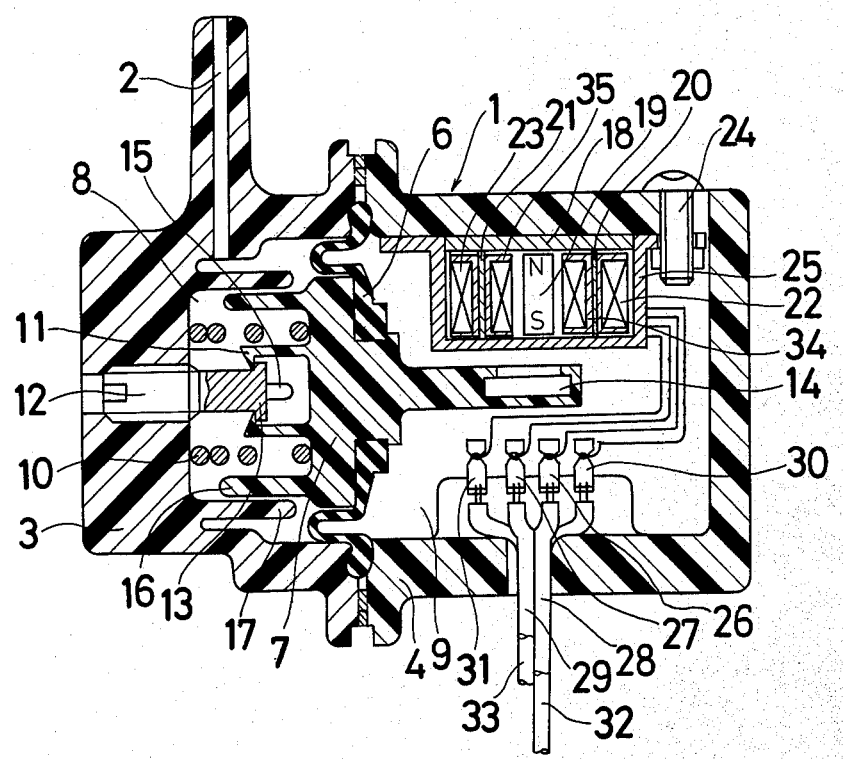
FIG. 7 is a longitudinal cross-sectional view of a pressure sensor according to another embodiment of the invention.
Figure 8C:
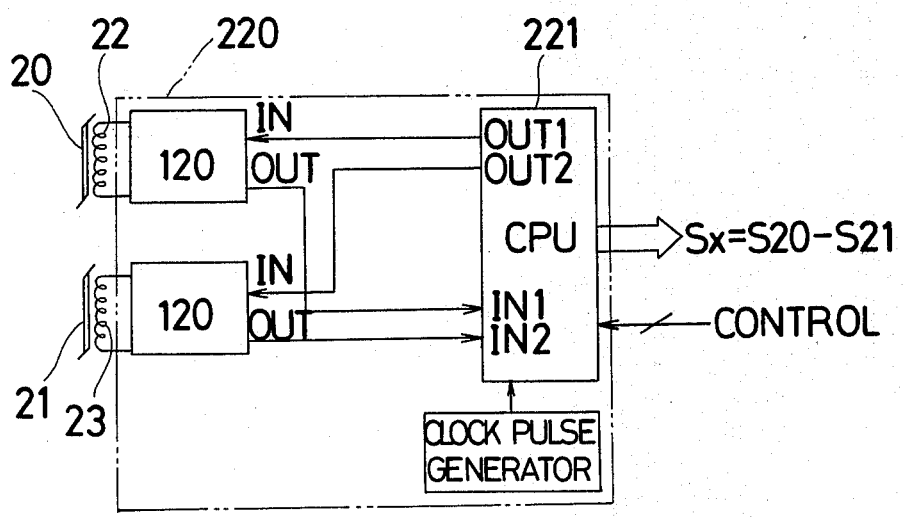
FIG. 8c is a block diagram of an electronic logical processing unit connected to the pressure sensor shown in FIG. 7 for producing a digital code indicative of the pressure detected.

The pressure sensor 1 shown in FIGS. 17 and 18 is constructed similar to the pressure sensor shown in FIGS. 14 and 15 except that a pair of magnetically soft members 20, 21 are provided each carrying an electrical coil 22 or 23, as indicated previously for the arrangement of FIG. 7. It will be understood that again with this embodiment, the detection circuit illustrated in FIGS. 8a, 8b or 8c may be used to provide the functioning of a pressure sensor.

Figure 19:
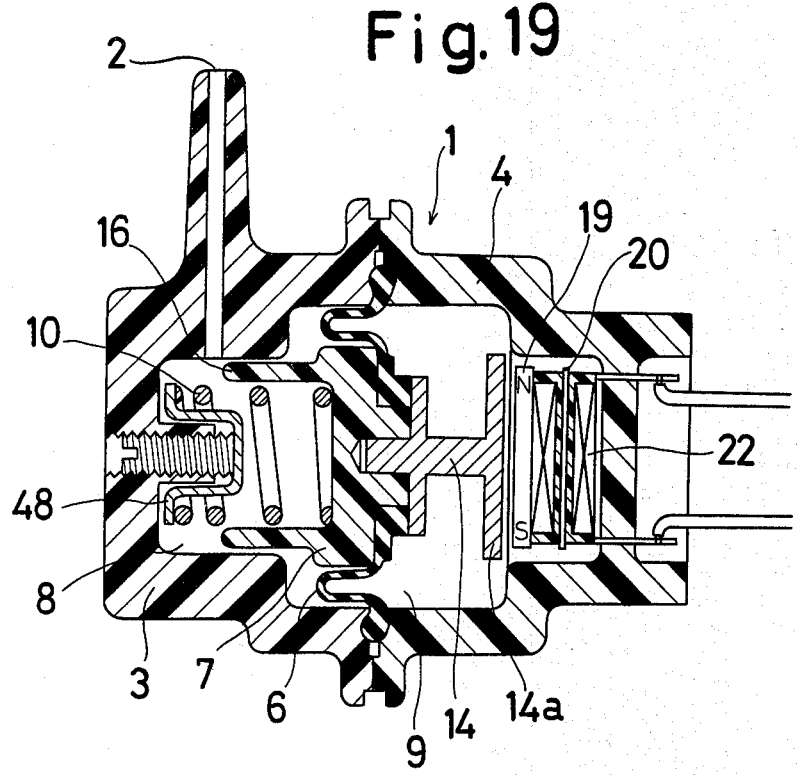
FIG. 19 is a longitudinal cross-sectional view of a pressure sensor according to a yet further embodiment of the invention.

Seventh Embodiment (FIG. 19)

In the pressure sensor shown in FIG. 19, the magnetically soft member 20 carrying an electrical coil 22 thereon is disposed on one side of the permanent magnet 19 while the ferromagnetic member 14 is disposed on the other side thereof. The ferromagnetic member 14 has its longitudinal axis disposed in a direction perpendicular to the longitudinal axes of the permanent magnet 19 and the electrical coil 22. The ferrogmagnetic member 14 includes a surface 14a which extends parallel to the axes of the permanent magnet 19 and the electrical coil 22. This arrangement again provides a useful functioning of a pressure sensor in a similar manner as with the previous embodiments.

Figure 20:
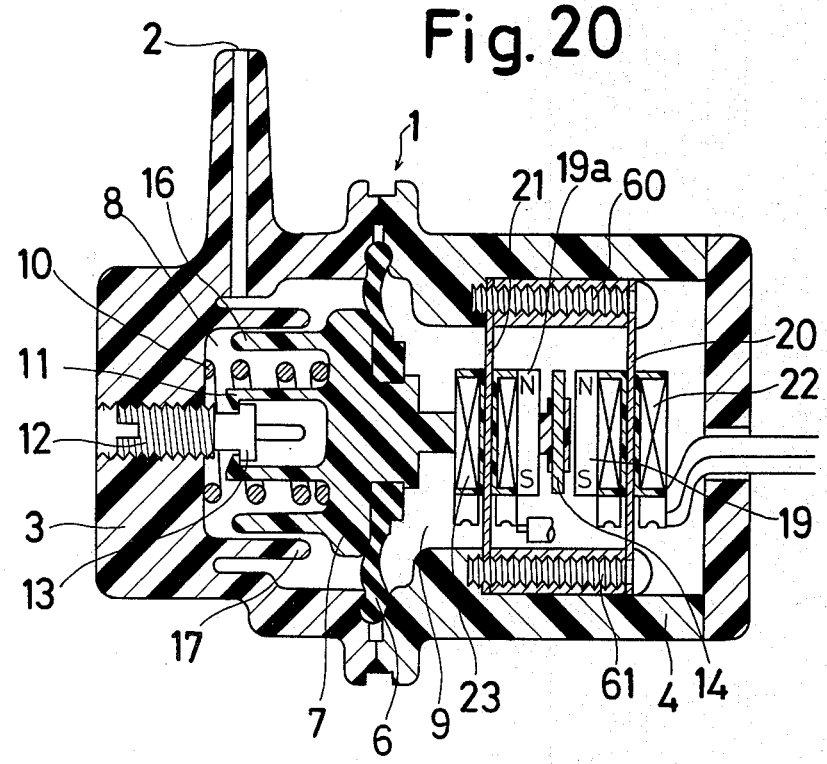
FIG. 20 is a longitudinal cross-sectional view of a pressure sensor according to another embodiment of the invention.

Eighth Embodiment (FIG. 20)

The pressure sensor 1 shown in FIG. 20 is similar to that of FIG. 19 except that another ferromagnetic member 21 carrying an electrical coil 23 and another permanent magnet 19a are disposed on the other side of the ferromagnetic member 14 from the initial combination of the permanent magnet 19 and the magnetically soft member 20. Again, the pressure sensor is fully effective to operate in the similar manner as mentioned previously. It is to be noted that the magnetically soft members 20, 21 are supported by screws 60, 61 which are threadably engaged with the cover 4.

In each of the described embodiments, the magnetically soft member exhibits a high magnetic permeability, and is formed of a plurality of sheets of an amorphous, magnetic material which is highly non-susceptible to deformation. However, other magnetic materials may be used for the magnetically soft member of the invention. By way of example, a $\mu$-metal such as $Ni_{80}Fe_{16}Mo_4$ or supermalloy such as $Ni_{80}Fe_{20}$ may be used. It should also be noted that the percentage by atomic weight of the materials used for the magnetically soft member, inclusive of the amorphous material, is not limited to the specific values disclosed herein, but can be suitably changed. For applications which require a high resistance to oscillations and deformation, an amorphous, magnetic material is preferably used. While the movable body comprises a combination of the diaphragm and the holder, it may comprise a piston alone or a combination of a piston and a holder.

The above embodiments have been described for a determination of a negative hydraulic pressure, but it will be readily understood that a pressure sensor capable of detecting a change in a positive pressure can also be obtained by disposing the spring which urges the diaphragm and the holder in the second space in which the atmosphere or a gas of a given pressure is confined or with which the latter communicates. Similarly, a liquid pressure rather than a gas pressure may be determined.

Having now fully set forth both the structure and operation of preferred embodiments of the concept underlying the present invention, various other embodiments as well as certain variations and modifications of the embodiments herein shown and disclosed will obviously occur to those skilled in the art. It is to be understood, therefore, that within the scope of the appended claims, the invention may be practiced otherwise than as specifically set forth herein.

What is claimed as new and desired to be secured by Letters Patent of the United States is:

1. A pressure sensor comprising:
   a casing defining an inner space;
   a movable body which divides the inner space of said casing into a first space and a second space, a pneumatic pressure to be determined being introduced into the first space;
   a spring for urging the movable body in a direction opposite to the pneumatic pressure;
   a ferromagnetic member coupled to the movable body;
   a permanent magnet for producing a magnetic field;
   core means of a magnetically soft material both disposed adjacent to a region of movement of the ferromagnetic member for forming a magnetic circuit therewith;
   at least one electrical coil disposed on the core; and
   detection means for detecting a change of intensity of magnetic flux produced in said core by the magnetic field of said permanent magnet means in response to a displacement of said ferromagnetic member, comprising
   means for applying a pulse voltage to said electrical coil, and
   means for measuring the time delay occurring from the application of said pulse voltage until saturation of said core.

2. A pressure sensor according to claim 1 in which the movable body comprises:
   a diaphragm, and
   a holder secured to said diaphragm, the ferromagnetic member being fixedly mounted on the holder.

3. A pressure sensor according to claim 1 in which the core comprises:
   an amorphous, magnetic material.

4. A pressure sensor according to claim 1 in which the ferromagnetic member comprises:
   an amorphous magnetic material.

5. A pressure sensor according to claim 1 in which the core comprises:
   a pair of magnetically soft members disposed on opposite sides of the permanent magnet.

6. A pressure sensor according to claim 1 wherein said detection means comprises:
   constant current source means for producing a constant current through said coil upon application of said pulse voltage thereto;
   wherein said pulse voltage applying means and said constant current source means product at a terminal of said coil a voltage signal delayed after application of said pulse voltage in relation to the pressure being measured.

7. A pressure sensor according to claim 1, further comprising:
   said ferromagnetic member having one end pivotally mounted in said second space and a pivotally movable portion disposed adjacent said core, wherein said ferromagnetic member undergoes pivotable movement in relation to the pressure being measured, thereby correspondingly changing the magnetic flux produced in said core.

8. A pressure sensor according to claim 1, further comprising:
   said core means comprising first and second core members laterally disposed adjacent said ferromagnetic member;
   first and second electrical coils disposed on respective of said first and second core members;
   said detection means comprising,
   means for alternately applying pulse voltages to said first and second coils,
   means for producing first and second voltage signals indicative of the time delays until saturation of said first and second core members occurring as as result of alternate application of said first and second pulse voltages to said first, and second coils, respectively, and
   means for producing a difference signal based on said first and second voltage signals, said difference signal being related to the pressure being measured.

* * * * *

UNITED STATES PATENT AND TRADEMARK OFFICE
CERTIFICATE OF CORRECTION

PATENT NO. : 4,351,191
DATED : September 28, 1982
INVENTOR(S) : SHINICHIRO IWASAKI It is certified that error appears in the above-identified patent and that said Letters Patent are hereby corrected as shown below:

```
Column 1 line 51 delete "simply" and substitute --simple--.
Column 2 line 51 delete "very" and substitute --much--.
Column 4 line 19 delete "providin" and substitute --providing--.
Column 5 line 12 delete "nextly".
Column 5 line 21 delete "is".
Column 6 line 58 change "tag" to --lag--.
Column 8 Table 1 at top of chart after "magnetically soft members
   20" "coil 22" should be underlined.
```
Column 10 line 68 delete "$t_2$" and substitute --$t_{d2}$--.
```
Column 11 Table 2 at top of chart after "magnetically soft members
   20,21" "coils 22,23" should be underlined.
Column 13 line 67 delete "40" and substitute --20--.
Column 14 line 34 delete "ferrogmagnetic" and substitute --ferro-
   magnetic--.
Column 16 line 45 delete "as" (second occurrence) and substitute
   --a--.
```

Signed and Sealed this

Eleventh Day of January 1983

[SEAL]

Attest:

GERALD J. MOSSINGHOFF

*Attesting Officer*     *Commissioner of Patents and Trademarks*